Aug. 7, 1956 J. C. YOUNG 2,757,995
PISTON
Filed March 29, 1954
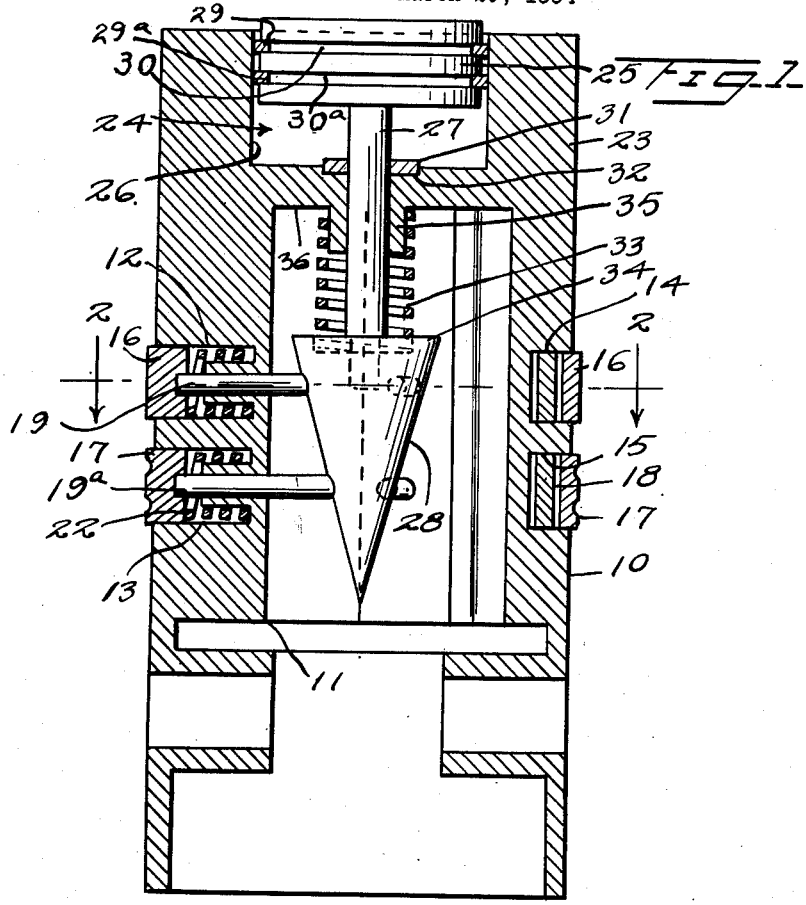
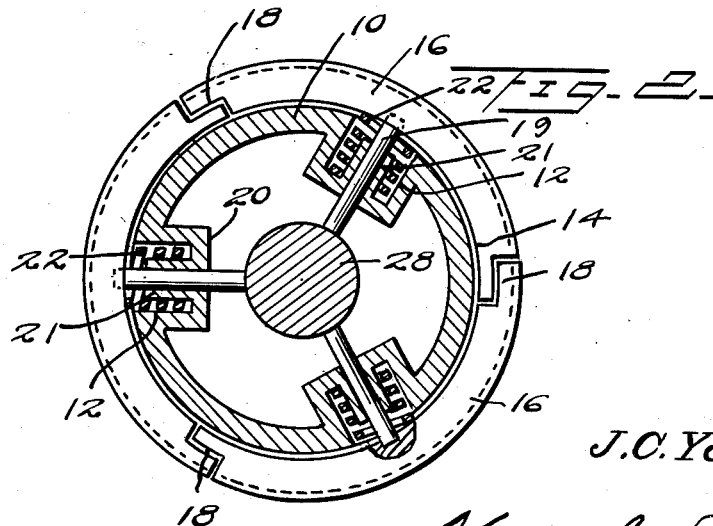
INVENTOR
J. C. Young
BY Kimmel & Crowell
ATTORNEYS

United States Patent Office 2,757,995
Patented Aug. 7, 1956

2,757,995

PISTON

John C. Young, Pittsburgh, Pa.

Application March 29, 1954, Serial No. 419,501

1 Claim. (Cl. 309—31)

My present invention relates generally to pistons for internal combustion engines as commonly equipped with expansible, elastic split rings, and my primary object is the provision of a piston having inelastic or substantially inelastic rings in segmental sections operating under normal spring pressure and augmented by a pressure, bearing a definite relation to the pressure within the combustion chamber, during the power stroke of the piston.

A further object in a general way is the provision of a piston construction employing rings which do not depend upon their inherent spring qualities as do the ordinary rings and in which the springs employed are for the purpose of merely positioning the inelastic or substantially inelastic ring segments against the cylinder wall.

More particularly, it is an object of my invention to defeat the pumping of oil by the piston rings, and to do this with a lesser number of rings than commonly employed, while at the same time eliminating the present danger of failure of proper contact of the rings with the cylinder wall due to loss of ring elasticity under the excessive heat to which they are subjected.

An additional important object of the invention is the provision of a piston of this character comprising an improvement over the piston disclosed in my prior Patent No. 2,080,297, dated May 11, 1937.

As conducive to a clearer understanding of the instant invention it has been found that leakage passing the pressure plate 25 and about the pin 27 impaired the efficiency of the previously described piston. An important object of this invention is, therefore, to overcome this deficiency.

It has further been found that the pin carrying the cone-shaped portion of the piston of the original patent tended to force the pressure plate outwardly beyond desired limits. An additional object of the invention, therefore, is the provision of means whereby this difficulty may be overcome.

The invention is preferably carried out in a manner which will now be described in detail with reference to the accompanying drawing, forming a part of this specification, and in which:

Figure 1 is a vertical sectional view through a piston constructed and equipped according to my invention, and Figure 2 is a horizontal sectional view taken therethrough substantially on the line 2—2 of Figure 1.

Referring now to these figures, the invention contemplates a piston 10 for internal combustion engines whose cylindrical wall 10 is formed with equidistantly, circumferentially spaced inwardly projecting ribs 11 of like construction, each rib having upper and lower chambers 12 and 13 of cylindrical shape, each chamber opening at its outer end for its full diameter through the outer surface of the piston wall.

The outer surface of the piston wall 10 is formed with upper and lower grooves 14 and 15 of approximately the same width as the diameters of the chambers 12 and 13, the upper groove 14 being in the horizontal plane of the upper chambers 12 and the lower groove 15 being in the plane of the lower chambers 13. Moreover, these grooves 14 and 15, as well as the ring segments 16 and 17 which respectively interfit the same, are substantially wider in practice in a direction axially of the piston than the usual elastic expansible rings and their grooves, and in this, as in other ways, I provide for a much greater effective length of life of the ring structure than is ordinarily the case.

The ring segments 16 and 17 are not only wider but thicker than the usual expansible rings and have their adjacent ends lap jointed as seen at 18, each segment being centered opposite one of the chambers 12, 13 and provided at this point with an inwardly projecting guide rod or stem 19 or 19a. Each chamber 12, 13 is closed at its inner end by a wall 20 which, in the proposed construction, is a part of the inner wall of the respective rib, and has a bearing sleeve 21 projecting therefrom axially into the respective chamber 12, 13 in spaced relation to the chamber wall. The opening of each sleeve is aligned with a bearing aperture through its respective wall 20, so that its respective ring segment rod or stem 19 or 19a may thus project inwardly beyond the respective rib 11 to the space within the piston wall 10 for a purpose which will presently appear.

The annular space between each bearing sleeve 21 and the wall of its chamber 12, 13 affords a guide channel for the reception of a coil spring 22 which, at its inner end, abuts the respective wall 20 and at its outer end engages the respective ring segment 16, 17 to hold the latter evenly and under a uniform normal pressure against a cylinder wall in use.

As seen in Figure 1, the top 23 of the piston has its outer upper surface provided with a coaxial, preferably cylindrical chamber 24 to receive a pressure-actuated plate 25 of conformable shape, and said piston top also has an opening 26 therethrough axially thereof and of the chamber 24. Pressure-actuated plate 25 is provided with a pair of sealing rings 29 and 29a which seat in grooves 30 and 30a, respectively, about the periphery of the plate in order to afford a tight seal against the sides of recess 24. In order to further effectively seal the interior of the piston against the escape of gases, a washer 31 seated in a washer receiving recess 32 tightly surrounds a pin 27 which slidably interfits opening 26 and connects the pressure plate 25 with a cone-shaped ring expander 28 within the piston below its top 23, having portions of its cone surface above and below the zones of the ring grooves 14, 15 to receive thereagainst the rounded inner ends of the several rods or stems 19 and 19a of the ring segments 16, 17.

In my prior patent it was found that under certain conditions the pin 27 served to raise the pressure plate 25 above a desired level in recess 24, and in order to overcome this difficulty the stem 27 is surrounded by a compressure spring 33 which is partly recessed into the base 34 of cone-shaped piston member 28, and at its other end encompasses a bearing sleeve 35 depending from the upper partition 36 of the piston frame through which the pin 27 passes.

The parts are so proportioned that in use when the ring segments 16, 17 are in close contact with a cylinder wall under uniform normal tension of springs 22 the cone 28 is held by the inner ends of rods or stems 19 and 19a so that the pressure plate 25 is substantially above the base of its chamber 24. When, however, an explosion occurs above the piston, its pressure, directly acting against plate 25, forces the latter and consequently the cone 28 downwardly and in such downward movement the latter acts to expand, by pressure, the rings by reason of its direct pressure outwardly against the contacting inner ends of the rods or stems 19 and 19a, thus augmenting the pressure contact of the ring segments 16, 17 against the cylinder wall in direct proportion to the pressure in the combustion chamber.

In this way, springs 22 can be made of a type to promote uniform effect and are located so as to minimize adverse effect by the heat of combustion, and the pressure of the solid inelastic rings is regulated so as to have the highest efficiency during the power stroke of the piston when such efficiency is needed, the pressure tapering off between such power strokes to provide for effective lubrication without oil pumping or unnecessary loss thereof.

While the inwardly projecting stems or rods 19 and 19a have been spoken of previously as features with which the ring segments are provided, it is not to be understood by this that they (the stems) are necessarily integral parts of the ring segments. It is quite possible and well within the invention to make the stems or rod 19 and 19a as separate parts having their outer ends so engaging the ring segments as to prevent circumferential movements of the latter. For example, the outer ends of the rods or stems may extend into conformable recesses of the ring segments as shown at 19 and 19a in Figure 1.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

A piston adapted for reciprocation in a cylinder of an internal combustion engine comprising a cylindrical wall having inner and outer faces, a top wall integrally formed on said cylindrical wall, said top wall having an axial chamber extending inwardly thereof, a partition formed integrally with said top wall forming a transverse bottom for said chamber, a cylindrical bearing sleeve projecting from the lower side of said partition, said partition and said sleeve having an axial bore extending therethrough, said partition having an axial recess formed in the upper side thereof, a plurality of elongated circumferentially spaced ribs projecting from the inner face of said cylindrical wall, said cylindrical wall having a pair of spaced annular parallel grooves formed in the outer face thereof, said cylindrical wall having a plurality of chambers extending radially inwardly from said grooves with said last named chambers extending into said ribs, said ribs each having radial bores extending axially from said last named chambers through said ribs, a pin mounted in said bore through said sleeve and said partition, a pressure plate secured to the upper end of said pin within said first named chamber, resilient sealing means annularly mounted on said pressure plate in engagement with the inner face of said first chamber, a washer engaging said pin and positioned in said recess to seal said pin to said partition, a cone shaped expander secured to the lower end of said pin in radially inward alignment with said axial bores through said ribs, a coil spring engaged over said sleeve at one end and against said expander at the other end biasing said spring away from said partition, a plurality of ring segments in said grooves, a guide rod secured to the center of each of said segments and extending through the axial bores in said ribs, and a coil spring in each of said last named chambers biasing said segments radially outwardly, said cone shaped expander engaging the inner end of each of said guide rods to move said ring segments radially outwardly simultaneously upon downward movement of said pressure plate, said pin and said expander by force of an explosion in said cylinder of said engine.

References Cited in the file of this patent

UNITED STATES PATENTS

| 1,002,173 | Naegelen | Aug. 29, 1911 |
| 1,377,106 | Welch | May 3, 1921 |
| 2,080,297 | Young | May 11, 1937 |

FOREIGN PATENTS

| 679,018 | Great Britain | Sept. 10, 1952 |